United States Patent
Ban et al.

[11] Patent Number: 6,082,316
[45] Date of Patent: Jul. 4, 2000

[54] HEAT GENERATOR FOR VEHICLE HEATING SYSTEM

[75] Inventors: Takashi Ban; Shigeru Suzuki; Tatsuyuki Hoshino; Takahiro Moroi, all of Kariya, Japan

[73] Assignee: Kabushiki Kaisha Toyoda Jidoshokki Seisakusho, Aichi-Ken, Japan

[21] Appl. No.: 08/841,922

[22] Filed: Apr. 8, 1997

[30] Foreign Application Priority Data

Apr. 10, 1996 [JP] Japan .................................. 8-088655

[51] Int. Cl.[7] .................................................. F02N 17/02
[52] U.S. Cl. .................................... 123/142.5 R; 122/26; 126/247; 237/12.3 R
[58] Field of Search ....................... 123/142.5 R; 122/26; 126/207; 237/12.3 R, 2 A

[56] References Cited

U.S. PATENT DOCUMENTS

| | | |
|---|---|---|
| 4,417,688 | 11/1983 | Schnaibel et al. |
| 5,366,150 | 11/1994 | Kaimito et al. ........................... 237/2 A |
| 5,573,184 | 11/1996 | Martin ................................. 237/12.3 R |
| 5,711,262 | 1/1998 | Ban et al. ........................... 123/142.5 R |
| 5,778,843 | 7/1998 | Inoue et al. ...................... 123/142.5 R |

FOREIGN PATENT DOCUMENTS

| | | |
|---|---|---|
| 237 335 | 10/1964 | Germany . |
| 2 223 661 | 12/1973 | Germany . |
| 7-52722 | 12/1995 | Japan . |

*Primary Examiner*—John Kwon
*Attorney, Agent, or Firm*—Morgan & Finnegan, L.L.P.

[57] ABSTRACT

An improved viscous heater for a vehicle heating system is disclosed. The viscous heater has a heat generator including a rotor that agitates viscous fluid to generate the heat. A vehicle engine transmits its rotation to the rotor via an electromagnetic clutch. A thermosensitive switch is attached to the heat generator and selectively connects and disconnects the electromagnetic clutch with electric power source. The thermosensitive switch is selectively activated and deactivated based on magnitude of the heat generated by the agitated viscous fluid. The thermosensitive switch is deactivated when the ambient temperature is in excess of the predetermined uppermost value (T) and activated when the temperature in smaller than the predetermined lowermost value (T−ΔT).

23 Claims, 8 Drawing Sheets

HEAT GENERATOR FOR VEHICLE HEATING SYSTEM

BACKGROUND OF THE INVENTION

1. Field of the Invention

The present invention relates to vehicle heating systems, and more particularly, to those employing a viscous fluid heat generator.

2. Description of the Related Art

Viscous fluid type heat generators agitate viscous fluid to generate heat. Viscous fluid heat generators are compact and efficient. Thus, viscous fluid type heat generators are often used in vehicles, which have limited space.

Japanese Examined Utility Model Publication No. 7-52722 describes a vehicle heating system including a viscous fluid type heat generator, a coolant temperature sensor and a control circuit. An engine drives the heat generator by means of an electromagnetic clutch. The temperature sensor is provided in a passage through which coolant flows. The coolant cools the engine, or absorbs the heat of the engine. The control circuit controls the electromagnetic clutch in accordance with the temperature detected by the temperature sensor. If the coolant temperature is equal to or lower than a predetermined first threshold temperature, the control circuit activates the electromagnetic clutch and causes the heat generator to generate heat. If the coolant temperature is equal to or higher than a predetermined second threshold temperature, the control circuit deactivates the clutch and stops the generation of heat from the heat generator. Accordingly, the viscous fluid type heat generator serves as an auxiliary heater and heats the passenger compartment when the coolant temperature is low.

There to another type of viscous fluid type heat generator that employs a single predetermined threshold temperature. This heat generator selectively activates and deactivates an electromagnetic clutch based on a single predetermined threshold temperature. Changes in the coolant temperature are detected and compared with the threshold temperature to determine whether to activate or deactivate the electromagnetic clutch. If the detected temperature falls below the threshold temperature, the clutch is activated and the heat generator generates heat. Accordingly, the coolant temperature starts to increase. Contrarily, if the detected temperature surpasses the threshold temperature, the clutch is deactivated and the heat generator stops generating heat. Accordingly, the coolant temperature starts to fall. This results in frequent activation and deactivation of the electromagnetic clutch, and thereby causes frequent and abrupt fluctuations of the engine's load torque. This makes the driver uncomfortable.

Using two different predetermined threshold temperatures (T, T–ΔT) reduces frequent activation and deactivation of the electromagnetic clutch. ΔT is the difference between the two threshold temperatures. However, the detected temperature is compared with the temperatures T –ΔT, T in an electric control circuit. This complicates the structure of the control circuit and requires an electrical circuit for activating the electromagnetic clutch. Accordingly, the system is troublesome and costly.

SUMMARY OF THE INVENTION

Accordingly, it is an objective of the present invention to provide a simplified heating system. It is another objective of the present invention to reduce the cost of the heating system.

To achieve the above objectives, according to the present invention, an improved heat generator for the use in a vehicle heating apparatus is provided. The heat generator includes a heat source, a control device for controlling magnitude of heat generated by the heat source and a switching device for selectively activate and deactivate the control means based on a first threshold value and a second threshold value, said first threshold value and said second threshold value being predetermined based on the magnitude of the generated heat.

According to the another aspect of the present invention, an improved vehicle heating apparatus is provided. The apparatus has a fluid circuit for circulating water that cools an engine, a heat generator that has a heat source that generates heat by agitating viscous fluid with a rotating body and heating the water flowing in the circuit and a heat core radiating temperature of the heated water in the circuit. The apparatus comprises a thermosensitive switch for selectively activating and deactivating the heat generator based on a first threshold value and a second threshold valuer said first threshold value and said second threshold value being predetermined based on the amount of the generated heat.

According to the further aspect of the present invention, an improved vehicle heating apparatus is provided. The apparatus has a fluid circuit for circulating water that cools an engine, a heat generator having a heat source that generates heat by agitating viscous fluid with a rotating body and heating the water flowing in the circuit and a heat core radiating temperature of the heated water in the circuit. The apparatus comprises a thermosensitive switch for selectively activating and deactivating the heat generator based on a first threshold value and a second threshold value, said first threshold value and said second threshold value being predetermined based on the amount of the generated heat.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

FIG. 1a is a diagrammatic cross-sectional view illustrating the inner structure of the heat sensitive switch of FIG. 1 in which the heat sensitive switch is on;

FIG. 2 is a diagrammatic cross-sectional view illustrating a viscous fluid type heat generator in a heating system in which an auxiliary heating switch is on;

FIG. 2a is a diagrammatic cross sectional view illustrating the inner structure of the heat sensitive switch of FIG. 2 in which the heat sensitive switch is on;

FIG. 3 is a diagrammatic cross-sectional view illustrating a viscous fluid type heat generator in a heating system in which an auxiliary heating switch is on;

FIG. 6 is a diagrammatic cross-sectional view illustrating a viscous fluid type heat generator in a heating system according to a third embodiment of the present invention in which an auxiliary switch is on;

FIG. 6a is a diagrammatic cross-sectional view illustrating the inner structure of the heat sensitive switch of FIG. 6 in which the heat sensitive switch is off;

FIG. 7 is a diagrammatic cross-sectional view illustrating a viscous fluid type heat generator of FIG. 6 in which an auxiliary switch is on;

FIG. 7a is a diagrammatic cross-sectional view illustrating the inner structure of the heat sensitive switch of FIG. 7 in which the heat sensitive switch is on;

FIG. 8 is a diagrammatic cross-sectional view illustrating a viscous fluid type heat generator in a heating system according to a fourth embodiment of the present invention in which an auxiliary switch is on;

FIG. 9 is a diagrammatic cross-sectional view illustrating a viscous fluid type heat generator of FIG. 8 in which an auxiliary switch is on;

FIG. 9a is a diagrammatic cross-sectional view illustrating the inner structure of the heat sensitive switch of FIG. 9 in which the heat sensitive switch is on.

DETAILED DESCRIPTION OF THE PREFERRED EMBODIMENTS

Figure 1:
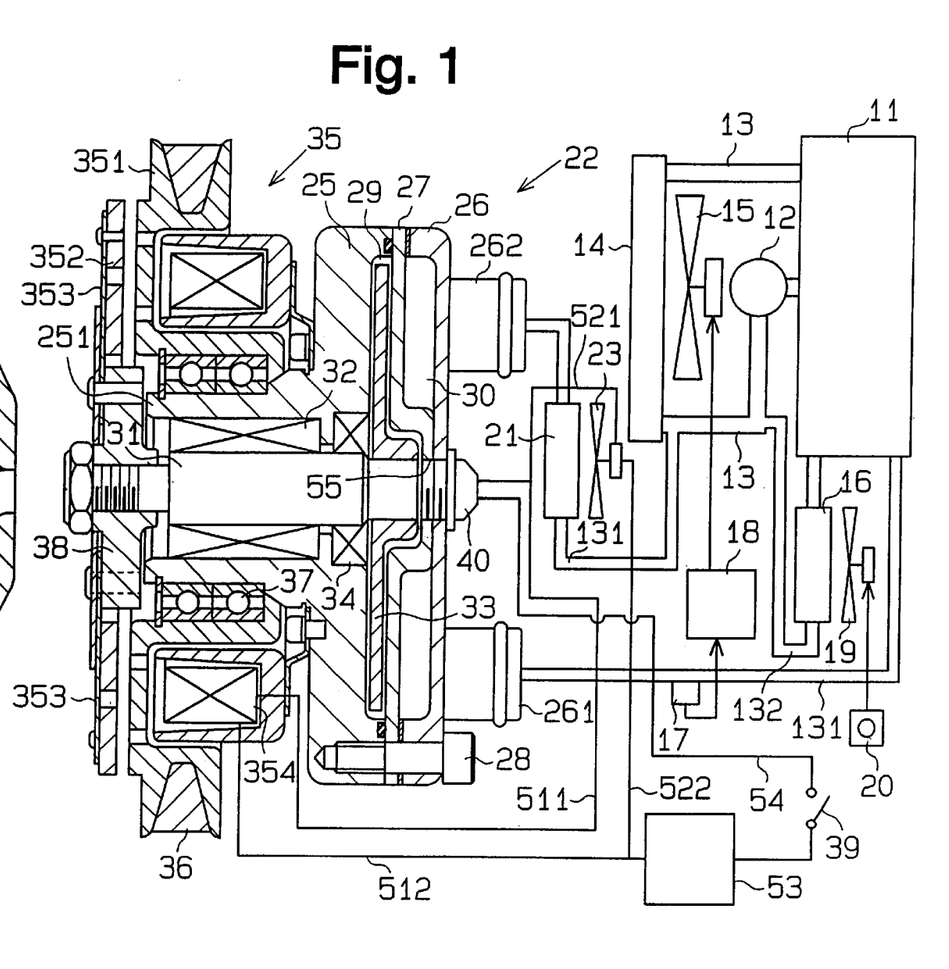
FIG. 1 is a diagrammatic cross-sectional view illustrating a viscous fluid type heat generator in a heating system according to a first embodiment of the present invention in which an auxiliary heating switch is off.
Figure 2:
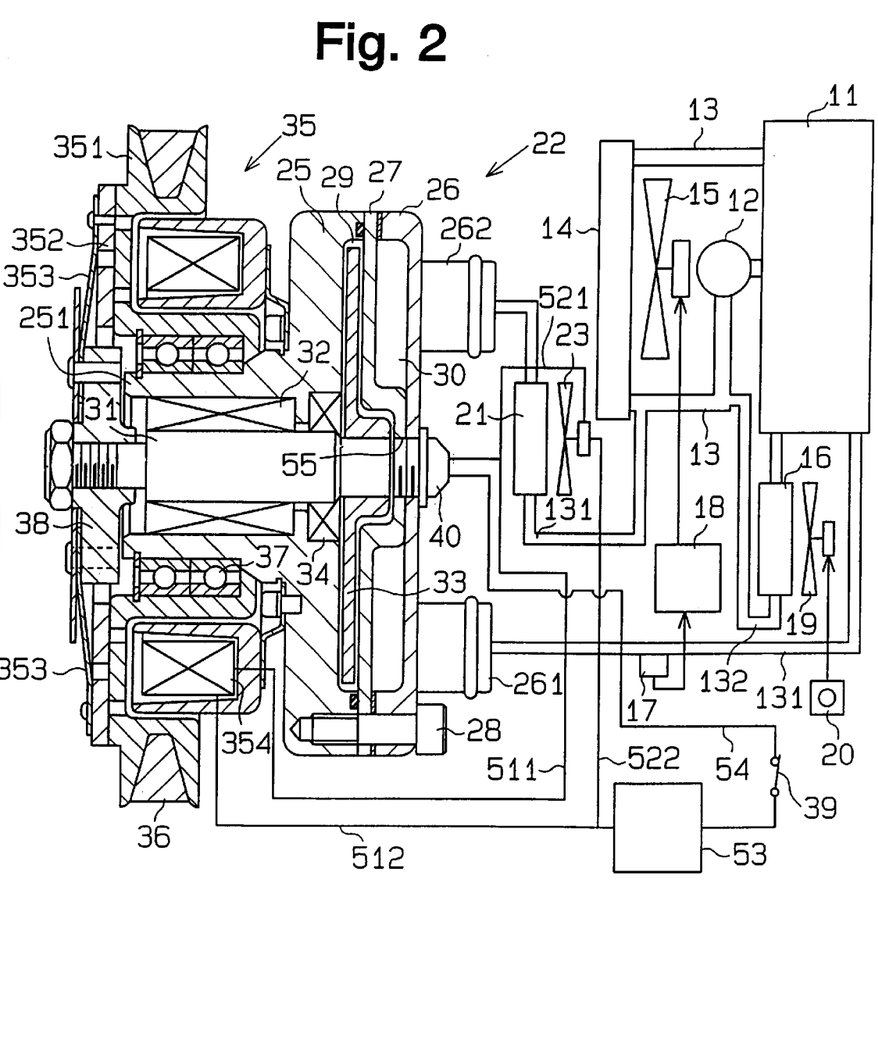
Figure 3:
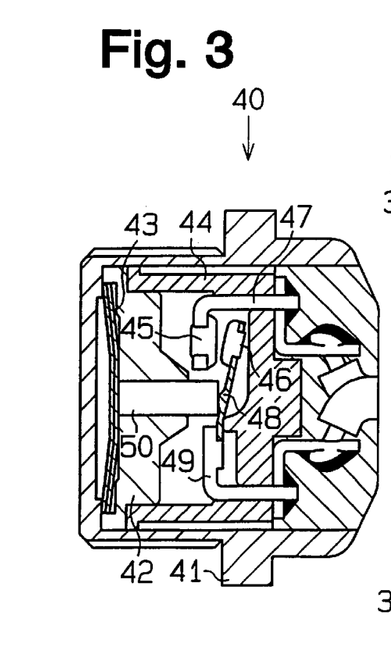

As shown in FIGS. 1 to 3, a vehicle engine 11 is connected to a radiator 14 by a water passage 13. A pump 12 is provided in the passage 13 for circulating coolant in the passage 13. A radiator 14 is also provided in the passage 13. The engines 11 is cooled by the circulated coolant. The coolant in the radiator 14 is cooled by an electrical cooling fan 15. A pair of secondary passages 131, 132 are located between the passage 13 and the engine 11. A temperature sensor 17 is provided in the secondary passage 131 for detecting the coolant temperature in the passage is 131. A controller 18 controls the fan 15 based on the detected temperature transmitted from the sensor 17. When the detected temperature is below a predetermined threshold temperature, the controller 18 does not activate the fan 15. Contrarily, when the detected coolant temperature reaches the threshold temperature, the controller 18 activates the fan 15.

A radiator 16 is provided in the secondary passage 132. Coolant in the radiator 16 from the passage 132 is cooled of heat by an electrical cooling fan 19. The fan 19 is activated by turning a main heating switch 20 on. Hot air from the radiator 16 flows into a passenger compartment of the vehicle. Accordingly, the radiator 16 and the fan 19 use the coolant that has been heated by the engine for warming the passenger compartment.

A radiator 21 and a viscous fluid type heat generator 22 are located in the secondary passage 131. Coolant in the radiator 21 is cooled by an electrical cooling fan 23.

The structure of the viscous fluid type heat generator 22 will now be described. The heat generator 22 includes a front housing 25 and a rear housing 26. The front housing 25 includes a cylindrical portion 251 projecting from the front face of the front housing 25. The rear housing 26 is secured to the front housing 25 with a plate 27 in between by a bolt 28. The plate 27 has a high thermal conductivity. A heating chamber 29 is defined between the plate 27 and the front housing 25. A water jacket 30 is defined between the plate 27 and the rear housing 26. The water jacket 30 is communicated with the secondary passage 131 by an inlet port 261 and an outlet port 262. Coolant discharged from the engine 11 enters the secondary passage 131 and is drawn into the water jacket 30 through the inlet port 261. The coolant in the water jacket 30 is then discharged from the outlet port 262 and flows to the radiator 21.

A rotary shaft 31 supported in the center of the cylindrical portion 251 and the front housing 25 with a radial bearing 32 located in between. The rotary shaft 31 rotates with respect to the housing 25, 26. A disk-shaped rotor 33 is secured to the rear end of the shaft 31 and is accommodated in the heating chamber 29. The heating chamber 29 is filled with silicone oil, which is a viscous fluid. A seal mechanism 34 is located between the front housing and the shaft 31 for preventing leakage of the fluid in the heating chamber 29 from along the circumference of the shaft 31.

An electromagnetic clutch 35 is provided about the cylindrical portion 251. The clutch 35 includes a solenoid 354 and a pulley 351. The pulley 351 is supported on the cylindrical portion 251 with an angular bearing 37. The pulley 351 rotates with respect to the cylindrical portion 251 and serves as a first clutch plate or the clutch 35. The pulley 351 is connected to the engine 11 by a belt 36. A ring 38 is secured to the front end of the rotary shaft 31. A second clutch plate 352 is coupled to the ring 38 by a leaf spring 353. Exciting the solenoid 354 moves the second clutch plate 352 against the force of the leaf spring, thereby coupling the clutch plate 352 with the pulley 351 as shown in FIG. 2. Contrarily, deactivating the solenoid 354 allows the force of the leaf spring 353 to separate the clutch plate 352 from the pulley 351.

A threaded hole 55 is formed in the rear housing 26 and the plate 27. A heat sensitive switch 40 that has a threaded casing 41 is screwed in the threaded hole 55. The switch 40 is selectively turned on and off by the temperature of the viscous fluid in the heating chamber 29. Viscous fluid is injected into the heating chamber 29 through the hole 55 before the switch 40 is screwed into the hole 55. The switch 40 also serves as a stopper for sealing the hole 55.

Figure 1A:
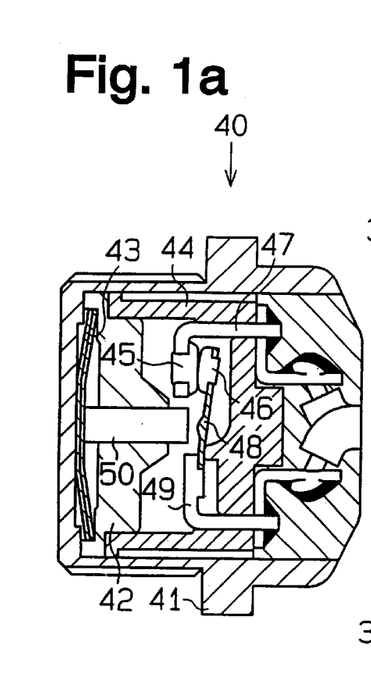
Figure 2A:
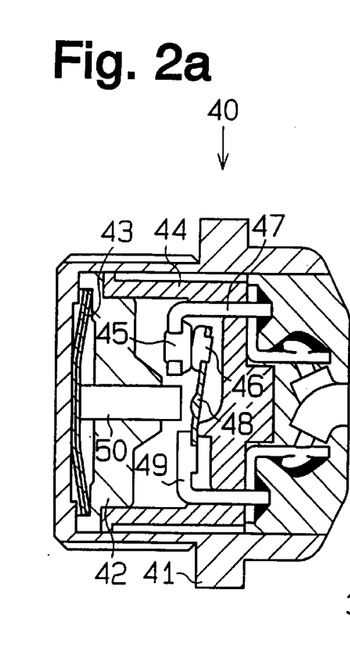

The inner structure of the heat sensitive switch 40, as shown in FIGS. 1a and 2a, will now be described. The switch 40 includes an inner cover 42 and an inner support 44 provided in the casing 41. Electrodes 47, 49 are fixed to the inner support 44 and accommodated in the space defined between the inner cover 42 and the inner support 44. A leaf spring 48 is held between the electrode 49 and the support 44 and extends toward the electrode 45. A fixed contact 45 and a movable contact 46 are fixed to the electrode 45 and the leaf spring 48, respectively. A bimetallic plate 43 is accommodated in the space defined between the inner wall of the casing 41 and the inner cover 42. The bimetallic plate 43 in deformed by heat. A pin 50 is slidably supported by the inner cover 42. The proximal end of the pin 50 in secured to the bimetallic plate 43. The pin 50 transmits the movement of the bimetallic plate 43 to the leaf spring 48.

The electrode 47 is electrically connected to the solenoid 354 and to the fan 23 by wires 511, 521. The solenoid 354 and the fan 23 are connected to a power source 53 by wires 512, 522. The electrode 49 is also connected to the power source 53 by a wire 54 and an auxiliary heating switch 39.

In the state illustrated in FIGS. 1a and 2a, the bimetallic plate 43 holds the pin 50 away from the leaf spring 48.

Therefore, the movable contact 46 contacts with the fixed contact 45 by the force of the leaf spring 48. This electrically connects the electrodes 47 and 49. In the state illustrated in FIG. 3a, the bimetallic plate 43 causes the pin 50 to push the leaf spring 48 against the force of the spring 48. This separates the movable contact 46 from the fixed contact 45, thereby disconnecting the electrode 47 from the electrode 49.

Figure 3A:
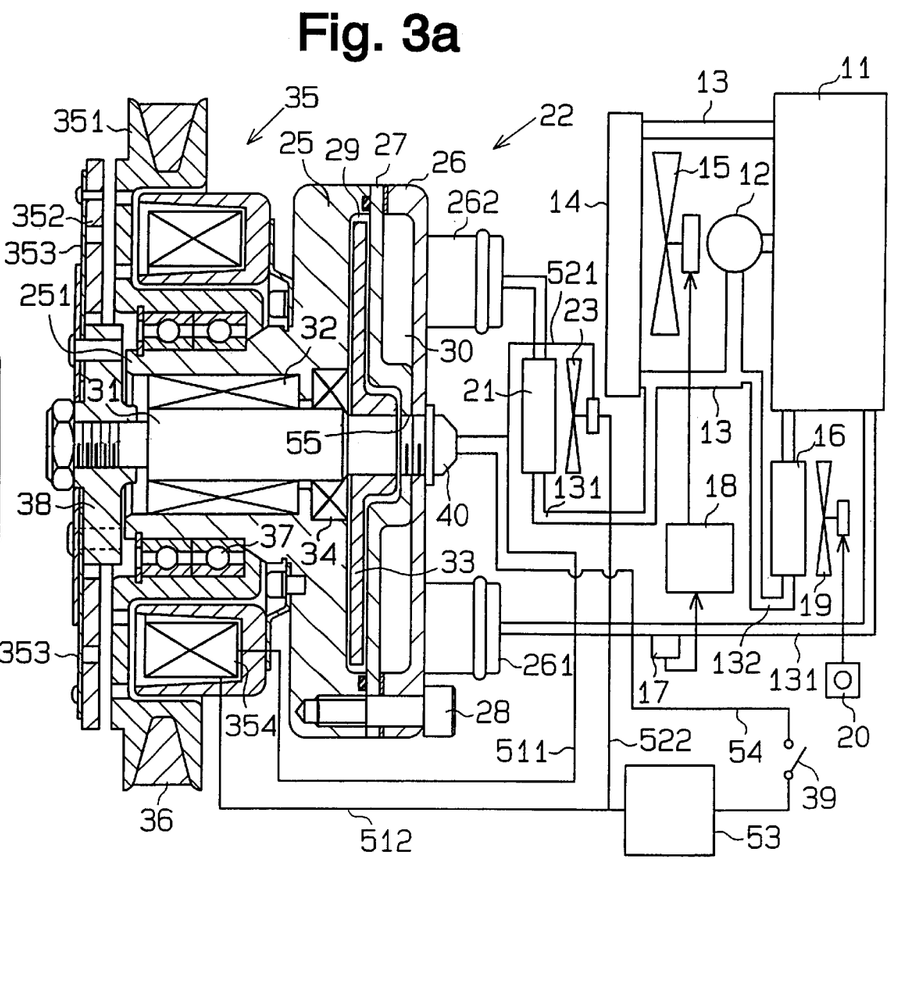
FIG. 3a is a diagrammatic cross-sectional view illustrating the inner structure of the heat sensitive switch of FIG. 3 in which the heat sensitive switch is off.
Figure 4:
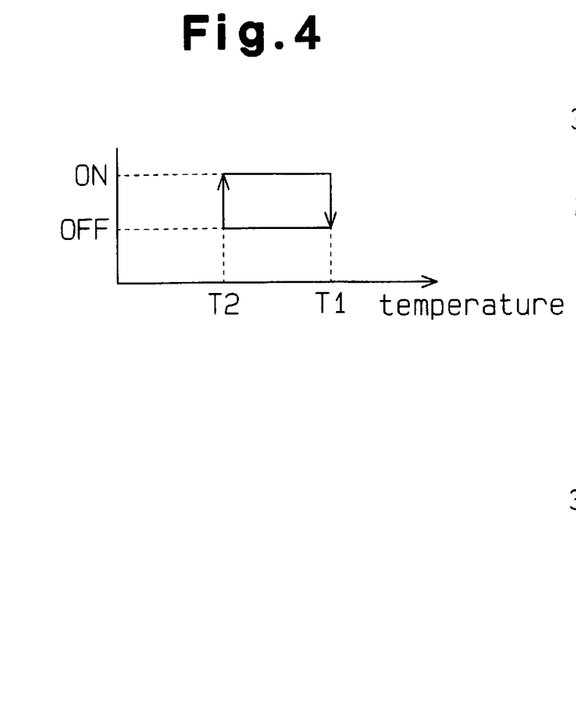
FIG. 4 is a graph showing temperature hysteresis property of a heat sensitive switch.

The switch 40 has a thermosensitivity as shown in the graph of FIG. 4. When the temperature about the bimetallic plate 43 reaches a first threshold temperature T1, the bimetallic plate 43 has a first shape illustrated in FIG. 3a and prevents electrical current between the electrodes 47 and 49. When the temperature about the bimetallic plate 43 falls to a second threshold temperature T2 (<T1), the bimetallic plate 43 has a second shape illustrated in FIGS. 1a and 2a and permits electrical current between the electrodes 47 and 49.

When the system is in the state illustrated in FIGS. 1 and 1a, the auxiliary heating switch 39 is off. Therefore, current is not sent to the electromagnetic clutch 35 and the cooling fan 23 is disconnected from the power source 53. Therefore, the clutch 35 is deactivated and the viscous fluid type heat generator 22 produces no heat. In this state, the temperature about the bimetallic plate 43 remains below the second threshold temperature T2 and thus the heat sensitive switch 40 is on.

If the auxiliary heating switch 39 is on as illustrated in FIG. 2, since the heat sensitive switch 40 is on, current is sent to the clutch 35 and the fan 23 from the power source 53. The clutch 35 and the fan 23 are activated, accordingly. The activation of the clutch 35 transmits the drive force of the engine 11 to the drive shaft 31, thereby rotating the rotor 33. The rotor 33 then agitates the viscous fluid in the heating chamber 29. Accordingly, the heat generator 22 generates heat. The generated heat is transmitted to coolant in the water jacket 30 by the plate 27. As a result, coolant drawn into the water jacket 30 through the inlet port 261 is heated and discharged from the outlet port 262.

If the clutch 35 remains activated, the temperature about the bimetallic plate 43 reaches the first threshold temperature T1. This turns the heat sensitive switch 40 off, thereby deactivating the clutch 35 and the fan 23, as illustrated in FIGS. 3 and 3a. Accordingly, the hut generator 22 stops generating heat.

It the clutch 35 remains deactivated, the temperature about the bimetallic plate 43 falls to the second threshold temperature T2. This turns the heat sensitive witch 40 on as illustrated in FIGS. 2 and 2a, thereby activating the clutch 35 and the fan 23. The heat generator 22 starts generating heat.

As described above, the heat sensitive switch 40 directly activates and deactivates the clutch 35 based on the first and second threshold temperatures T1, T2. This simplifies the control of the system as compared to the prior art system disclosed in Japanese Unexamined Utility Model No. 7-52722. Also, the cost of the disclosed heating system is lower than that of the prior art.

The heat sensitive switch 40 includes the bimetallic plate 43, which is deformed in accordance with the temperature about it. Specifically, the bimetallic plate 43 changes its shape between the first shape for preventing current through the switch 40 and the second shape for permitting current through the switch 40. This simplifies the structure of the switch 40 and improves the detection accuracy.

Figure 5:
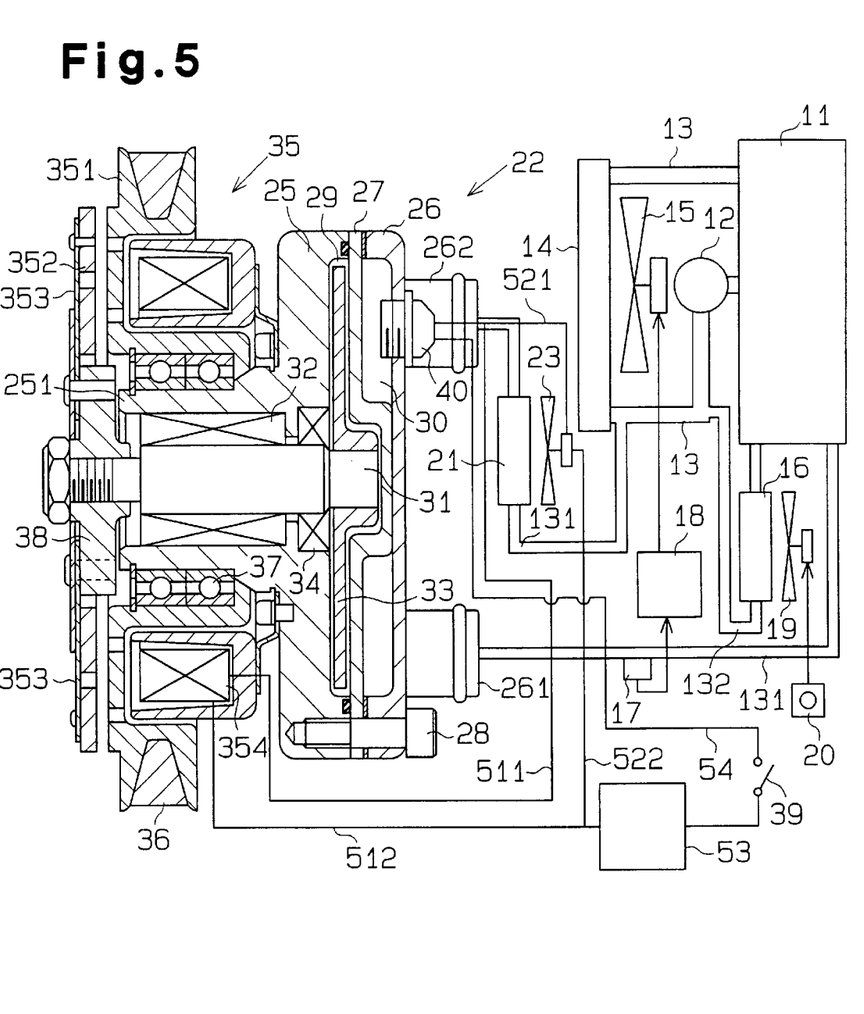
FIG. 5 is a diagrammatic cross-sectional view illustrating a viscous fluid type heat generator in a heating system according to a second embodiment of the present invention.

A second embodiment will now be described with reference to FIG. 5. According to the embodiment, the heat sensitive switch 40 is provided in the vicinity of the outlet port 262 of the rear housing 26. The switch 40 detects the coolant temperature in the water jacket 30 near the outlet port 262. Accordingly, the heating status of the heat generator 22 is accurately detected.

A third embodiment will now be described with reference to FIGS. 6, 6a, 7 and 7a. In this embodiment, the rotary shaft 31 of the heat generator 24 is directly coupled to the engine 11 without a clutch in between. A reservoir chamber 68 for viscous fluid is defined between the rear housing and the plate 27. An extract port 271 and a return port 272 are formed in the plate 27 for communicating the heating chamber 29 with the reservoir chamber 68. The diameter of the return port 272 is larger than that of the extract port 271. The distance between the extract port 271 and the axis of the shaft 31 is shorter than the distance between the return port 272 and the axis of the shaft 31.

Figures 6, 6A:
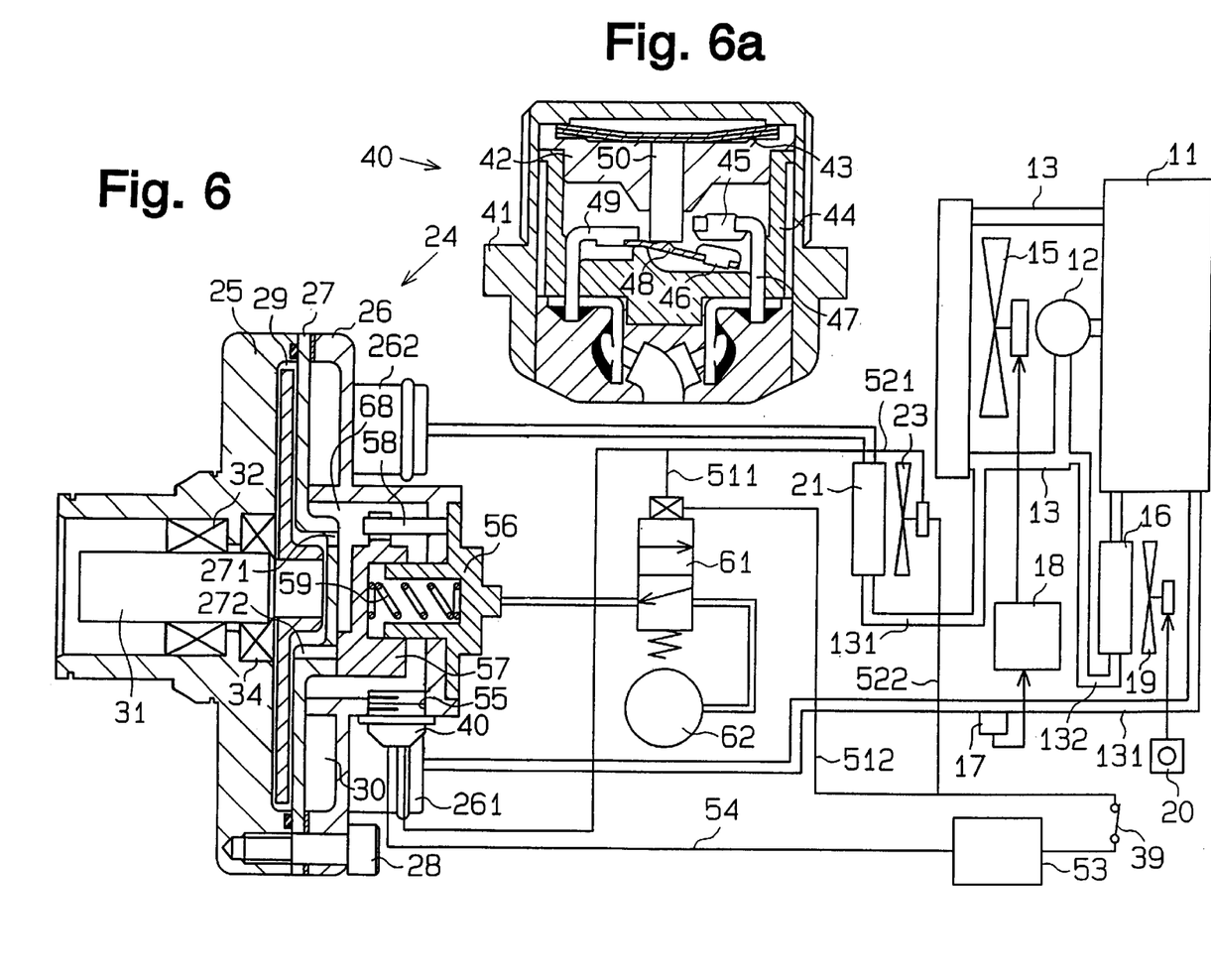
Figures 7, 7A:
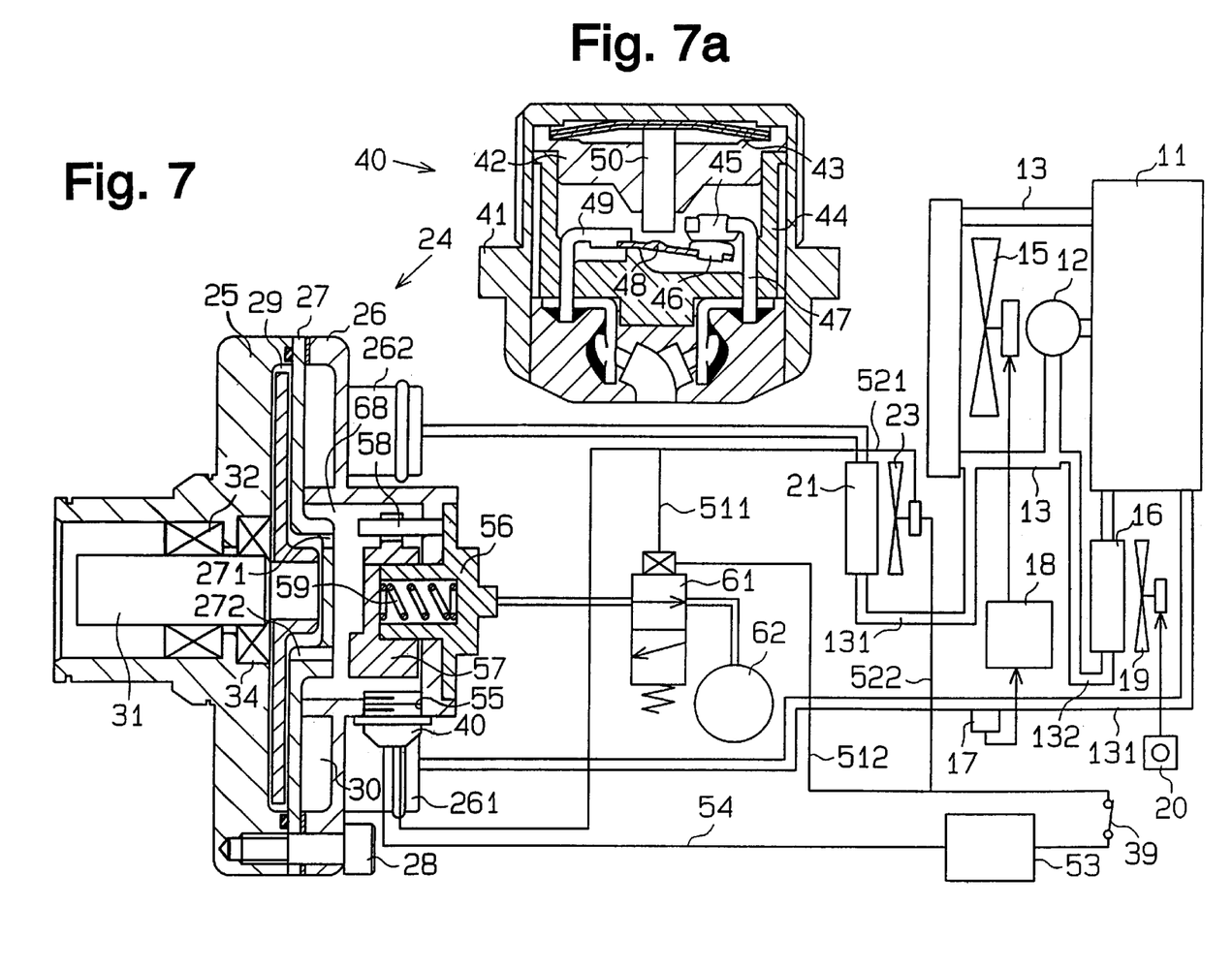

A cylinder 56 for ventilation is provided on the rear housing 26. A spool 57 is slidably supported by the cylinder 56. A pin 58 projects from the inner wall of the rear housing 26. The pin 58 prevents the spool 57 from rotating. A spring 59 extends between the cylinder 56 and the spool 57 for urging the spool 57 toward the plate 27.

The cylinder 56 is connected to a pump 62 with an electromagnetic valve 61 in between. The pump 62 is driven by the engine and produces negative pressure.

A threaded hole 55 is for in the rear housing 26 and communicates with the reservoir chamber 68. The heat sensitive switch 40 is screwed in the hole 55 for detecting the temperature of viscous fluid in the reservoir chamber 68. The electromagnetic valve 61 is connected to the switch 40 by a wire 511 and to the power source 53 by a wire 512.

In FIGS. 6, 6a, 7 and 7a, the auxiliary heating switch 39 is on. When the temperature of the viscous fluid in the reservoir chamber 60 reaches the first threshold temperature T1, the heat sensitive switch 40 is turned off as shown in FIG. 6. This de-excites the electromagnetic valve 61. In this state, the valve 61 communicates the interior of the cylinder 56 with the atmosphere. The pressure in the cylinder 56 becomes equal to the atmospheric pressure. The forces of the spring 59 and the atmospheric pressure press spool 57 against the plate 27, thereby causing the spool 57 to close the return port 272. Viscous fluid in the heating chamber 29 is drawn into the reservoir chamber 68 through the extract port 271 by the Weissenberg effect. Therefore, the volume of the viscous fluid in the heating chamber 29 decreases and the heat generator 24 generates less heat.

When the temperature of viscous fluid in the reservoir 68 falls to the second threshold temperature T2, the heat sensitive switch 40 is turned on as shown in FIG. 7a. This excites the electromagnetic valve 61. In this state, the valve 61 communicates the interior of the cylinder 56 with the pump 62. The pressure in the cylinder 56 becomes lower than the atmospheric pressure. The spool 57 is thus separated from the plate 27. This opens the return port 272. Although viscous fluid in the heating chamber 29 is drawn into the reservoir chamber 68 through the extract port 271, the fluid is returned to the heating chamber 29 from the reservoir chamber 68 through the return 272. The amount of the viscous fluid that is returned to the heating chamber 29 is greater than the amount of the fluid that is drawn into the reservoir chamber 68. Therefore, the volume of the viscous fluid in the heating chamber 29 increases and the heat generator 24 generates more heat.

Employment of two different threshold temperature reduces front activation and deactivation of the heat generator 24. Abrupt torque fluctuations of the engine 11 is reduced, accordingly.

A fourth embodiment of the present invention will now be described with reference to FIGS. 8, 8a, 9 and 9a. In this embodiment, the plate 27 is provided with a cylindrical portion 273. A solenoid 64 is accommodated in the cylindrical portion 273. A spool 63 is slidably accommodated in the solenoid 64. A reservoir chamber 67 for viscous fluid is defined between the spool 63 and an end of the rotary shaft 31. A snap ring 66 is fitted in the inner wall of the reservoir chamber 67. A spring 65 extends between the spool 63 and the snap ring 66 for urging the spool 63 away from the snap ring 66. When excited, the solenoid 64 moves the spool 63 against the force of the spring 65 and into contact with the snap ring 66. When the solenoid 64 is de-excited, the force of the spring 65 pushes the spool 63 away from the snap ring 66. Accordingly, the volume to the reservoir chimer 67 is varied by exciting and de-exciting the solenoid 64. The volume of the viscous fluid retained in the heating chamber 29 and the reservoir chamber 67 is smaller than the minimum volume of the heating chamber 29 and the reservoir chamber 67.

Figure 8:
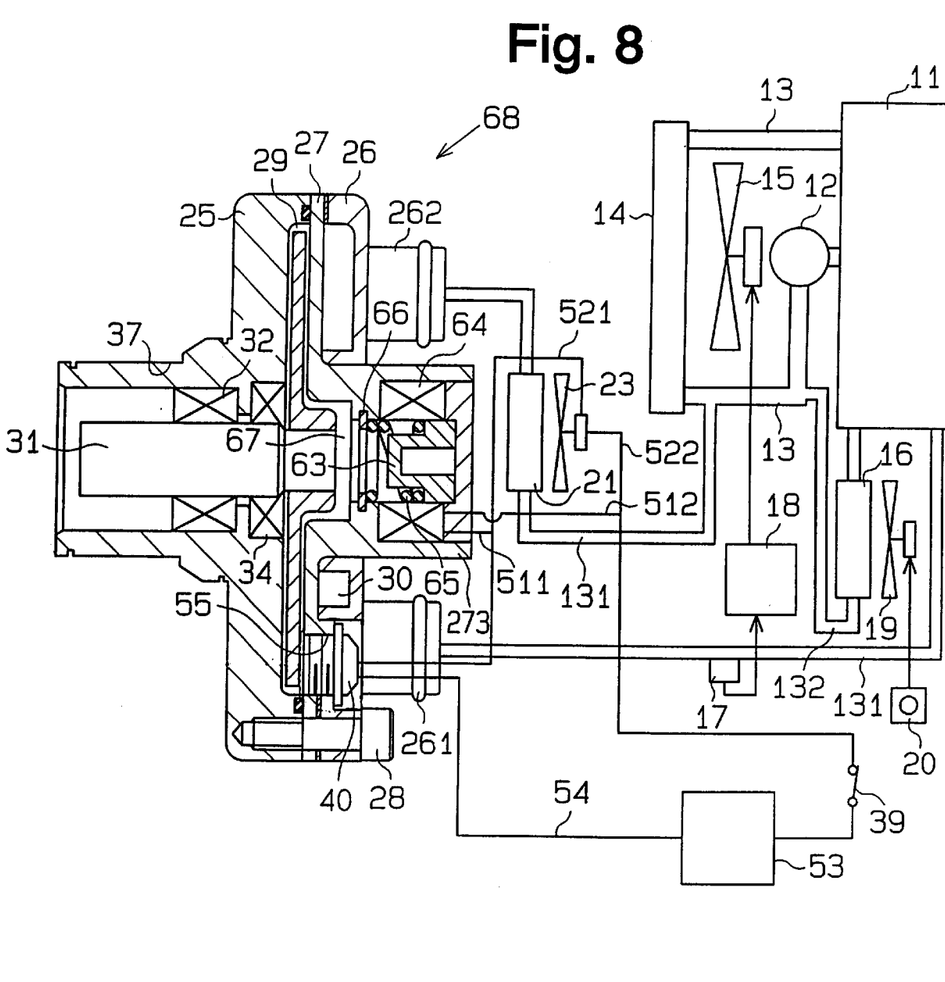
Figure 9:
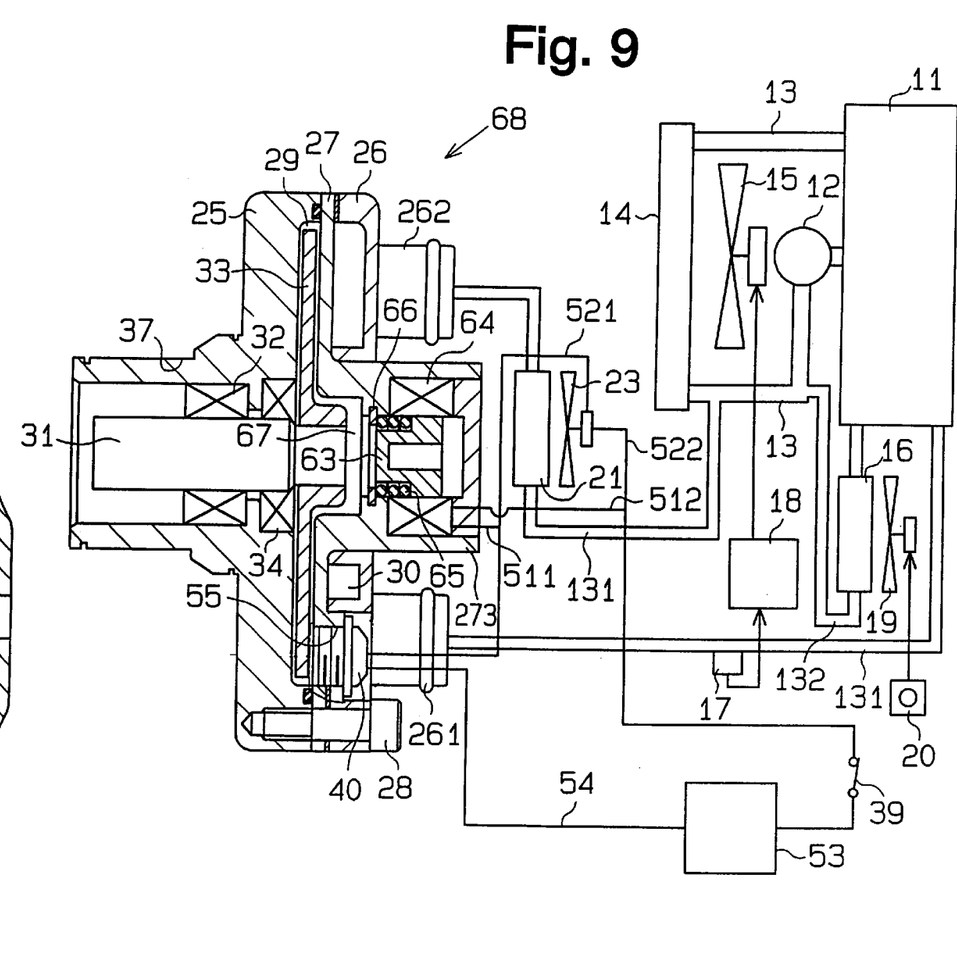

A threaded hole 55 is formed in the plate 27. A heat sensitive switch 40 is screwed in the hole 55. The solenoid 64 is connected to the switch 40 through a wire 511 and to the power source 53 through a wire 512.

Figure 8A:
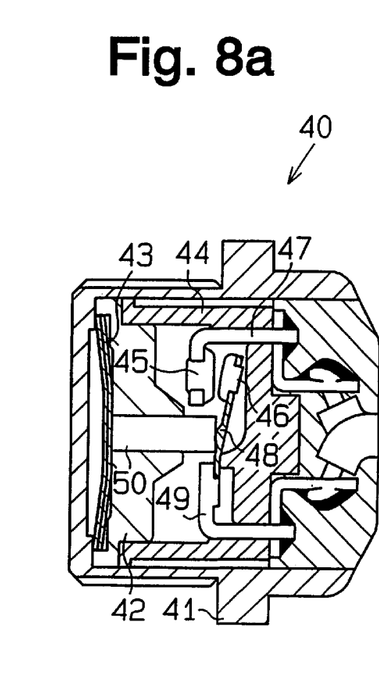
FIG. 8a is a diagrammatic cross-sectional view illustrating the inner structure of the heat sensitive switch of FIG. 8 in which the heat sensitive switch is off.

In FIGS. 8, 8a, 9 and 9a, the auxiliary switch 39 is on. When the temperature of the viscous fluid in the heating chamber 29 reaches the first threshold temperature T1, the heat sensitive switch 40 is turned off as shown in FIG. 8a. This de-excites the solenoid 64. Accordingly, the spool 63 separates from the snap ring 66, and the volume of the reservoir chamber 67 is maximized. The volume of the viscous fluid in the heating chamber 29 decreases to almost zero. Therefore, the heat generator 24 generates almost no heat.

Figure 9A:
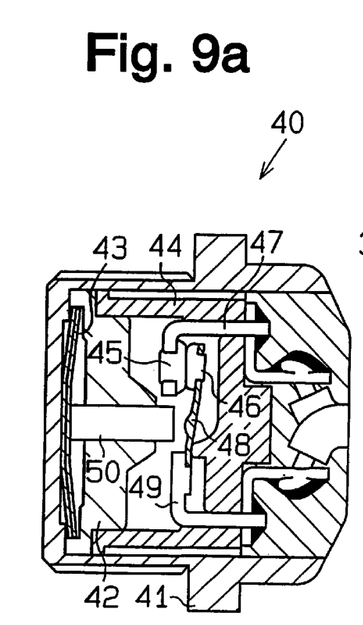

When the temperature of viscous fluid in the heating chamber 29 falls to the second threshold temperature T2, the heat sensitive switch 40 is turned on as shown in FIG. 9a. This excites the solenoid 64. Accordingly, the spool 63 contacts with the snap ring 66. The volume of the reservoir chamber 67 is minimized and the volume of the viscous fluid in the heating chamber 29 is maximized. Therefore, the heat generator 24 generates more heat.

Although four embodiments of the present invention have been described herein, it should be apparent to those skilled in the art that the present invention may be embodied in many other specific forms without departing from the spirit or scope of the invention. Particularly, it should be understood that the invention may be embodied in the following forms:

Instead of the bimetallic plate 43 in the heat sensitive switch 40, a plate made of shape memory alloy may be employed. A thermostat may be used instead of the heat sensitive switch 40. A pressure sensitive switch that has pressure hysteresis property between two threshold pressures may be employed instead of the heat sensitive switch 40. In this case, the heat generated by the heat generator 24 in converted into pressure, The heat generator 24 in selectively activated and deactivated according to the threshold pressures.

The present invention may be applied to other type of auxiliary heater, such as gear pump heaters and overcurrent heaters that are driven by a vehicle engine.

Therefore, the present examples and embodiments are to be considered as illustrative and not restrictive and the invention is not to be limited to the details given herein, but may be modified within the scope and equivalence of the appended claims.

What is claimed is:

1. A heat generator used in a vehicle heating apparatus, said heat generator comprising:

a heat source;

a housing for accommodating the heat source;

control means for controlling the magnitude of the heat generated by the heat source, the control means including an electric circuit and a thermosensitive switch for selectively activating and deactivating the electric circuit based on a first threshold value and a second threshold value, said first threshold value and said second threshold value being predetermined based on the magnitude of the generated heat, wherein said thermosensitive switch is mounted on the housing.

2. The heat generator as set forth in claim 1, wherein said thermosensitive switch activates the electric circuit when temperature based on the heat generated by the heat source reaches the second threshold value and deactivates the electric circuit when said temperature reaches the first value, and wherein the first value is larger than the second value.

3. The heat generator as set forth in claim 2, wherein said thermosensitive switch includes:

an element having a first shape for permitting current to flow through the thermosensitive switch and a second shape for preventing current from flowing through the thermosensitive switch, the element changing between the first shape and the second shape in accordance with the temperature around the element;

a fixed contact; and a movable contact selectively contacting and separating from the fixed contact based on the change from the first shape to the second shape of the element.

4. The heat generator as set forth in claim 3, wherein said heat source includes:

a rotating body; and viscous fluid being heated up by rotation of rotating body.

5. The heat generator as set forth in claim 4 wherein the rotating body is adapted to be rotated by a vehicle engine, and further comprising:

a chamber for accommodating the rotating body and the viscous fluid, wherein the thermosensitive switch is mounted to change between the first shape and the second shape based on the temperature of the viscous fluid in the chamber.

6. The heat generator as set forth in claim 5 further comprising altering means for altering the magnitude of the heat generated by the viscous fluid.

7. The heat generator as set forth in claim 7, wherein said altering means includes:

an electric source;

an electromagnetic clutch for selectively connecting and disconnecting the rotating body with the engine; and said electromagnetic clutch being selectively activated and deactivated by the thermosensitive switch.

8. The heat generator as set forth in claim 6, wherein said altering means changes the amount of the viscous fluid within said chamber.

9. The heat generator as set forth in claim 8, wherein said altering means includes:

said chamber having a wall, said wall having a first through hole and a second through hole, said first through hole discharging the viscous fluid from the chamber, said second through hole introducing the viscous fluid into the chamber;

a member for contacting and separating from the wall, said member closing the second through hole when the member contacts the wall and opening said second through hole when the member separates from the wall;

a pump for generating negative pressure, said pump being selectively connected and disconnected with the member; and a valve disposed between the member and the pump, said valve being arranged to connect the pump with the member upon activation of the thermosensitive switch.

10. The heat generator as set forth in claim 6 wherein said altering means changes the capacity of the chamber for the viscous field.

11. The heat generator as set forth in claim 10, wherein said altering means includes:

said chamber having a first space and a second space communicating to the first space;

a moving member selectively extendable and retractable with respect to the second space, said moving member being arranged to decrease a capacity of the second space when the moving member be retracted; and a shifting member for shifting the moving member to the second space when the thermosensitive switch is actuated.

12. The heat generator as set forth in claim 5 further comprising:

said chamber having an inlet hole through which the viscous fluid is introduced into the chamber; and a water-tight plug that is inserted in said inlet hole.

said plug being formed by the thermosensitive switch.

13. A vehicle heating apparatus having a fluid circuit for circulating water that cools an engine, a heat generator having a heat source that generates heat by agitating viscous fluid with a rotating body and heating the water flowing in the circuit and a heat core radiating the heat of the heated water in the circuit, and a housing for accommodating the heat generator said heat generator comprising:

control means for controlling magnitude of heat generated by the heat source, the control means including an electric circuit; and a thermosensitive switch for selectively activating and deactivating the heat generator based on a first threshold value and a second threshold value, said first threshold value and said second threshold value being predetermined based on the amount of the generated heat, wherein said thermosensitive switch is mounted on the housing.

14. The apparatus as set forth in claim 13, wherein said thermosensitive switch activates the electric circuit when temperature based on the heat generated by the heat source reaches the second threshold value and deactivates the electric circuit when said temperature reaches the first value, and wherein the first value is larger than the second value.

15. The apparatus as set forth in claim 14, wherein said thermosensitive switch includes:

an element having a first shape for permitting current to flow through the thermosensitive switch and a second shape for preventing current from flowing through the thermosensitive switch, the element changing between the first shape and the second shape in accordance with the temperature around the element;

a fixed contact; and a movable contact selectively contacting and separating from the fixed contact based on the change from the first shape to the second shape of the element.

16. The apparatus as set forth in claim 15, wherein said element includes a bimetal.

17. The apparatus as set forth in claim 15, wherein said element includes a shape memory alloy.

18. The apparatus as set forth in claim 13 further comprising:

a vehicle engine for rotating the rotating body; and a chamber defined by the housing for accommodating the rotating body and the viscous fluid.

19. The apparatus as set forth in claim 18 further comprising said fluid circuit having a water jacket disposed adjacent to the chamber.

20. The apparatus as set forth in claim 19, wherein said thermosensitive switch is attached to the water jacket and selectively activated and deactivated based on water temperature in the water jacket.

21. The apparatus as set forth in claim 18 further comprising:

said chamber having an inlet hole through which the viscous fluid is introduced to the chamber; and a water-tight plug that is inserted in said inlet hole; and said plug being formed by the thermosensitive switch.

22. A heat generator used in a vehicle heating apparatus, said heat generator comprising:

a heat source including a rotating body and viscous fluid being heated up by rotation of the rotating body;

control means for controlling the magnitude of the heat generated by the heat source, the control means including an electric circuit;

a chamber for accommodating the rotating body and the viscous fluid;

coolant being heated up by the heat generated by the heat source;

a water jacket disposed adjacent to said chamber for accommodating the coolant;

a thermosensitive switch mounted in either one of the chamber or water jacket for selectively activating and deactivating the electric circuit based on a first threshold value and a second threshold value, said first threshold value and said second threshold value being predetermined based on the temperature of the viscous fluid in the chamber or the coolant in the waterjacket.

23. The heat generator as set forth in claim 22, wherein said thermosensitive switch includes:

an element having a first shape for permitting current to flow through the thermosensitive switch and a second shape for preventing current from flowing through the thermosensitive switch, the element changing between the first shape and the second shape in accordance with the temperature around the element;

a fixed contact; and a movable contact selectively contacting and separating from the fixed contact based on the change from the first shape to the second shape of the element.

* * * * *

UNITED STATES PATENT AND TRADEMARK OFFICE
CERTIFICATE OF CORRECTION

PATENT NO. : 6,082,316
DATED : July 4, 2000
INVENTOR(S) : Takashi Ban et al.

Page 1 of 1

It is certified that error appears in the above-identified patent and that said Letters Patent is hereby corrected as shown below:

Column 2,
Line 20, please change "second threshold valuer said first" to -- second threshold value, said first --;

Column 3,
Line 27, please change "auxiliary switch is on;" to -- auxiliary switch is on; and --;
Line 39, please change "The engines 11 is" to -- The engine 11 is --;
Line 43, please change "in the passage is 131." to -- the passage 131. --;

Column 4,
Line 58, please change "pin 50 in secured" to -- pin 50 is secured --;

Column 6,
Line 36, please change "reservoir chamber 60" to -- reservoir chamber 68 --;

Column 7,
Line 17, please change "volume to the reservoir chimer 67" to -- volume of the reservoir chamber 67 --;
Line 60, please change "in converted into pressure, The heat generator 24 in" to -- is converted into pressure. The heat generator 24 is --;
Line 64, please change "auxiliary heater, such as" to -- auxiliary heaters such as --;

Column 9,
Line 34, please change "inserted in said inlet hole." to -- inserted in said inlet hole, --; and
Line 42, please change "heat generator said heat" to -- heat generator, said heat --.

Signed and Sealed this

Thirtieth Day of April, 2002

*Attest:*

*Attesting Officer*

JAMES E. ROGAN
*Director of the United States Patent and Trademark Office*